United States Patent
Gutierrez et al.

(10) Patent No.: US 8,510,215 B2
(45) Date of Patent: Aug. 13, 2013

(54) METHOD AND SYSTEM FOR ENROLLING A VOICEPRINT IN A FRAUDSTER DATABASE

(75) Inventors: Richard Gutierrez, Mountain View, CA (US); Anthony Rajakumar, Fremont, CA (US); Lisa Marie Guerra, Los Altos, CA (US); David Hartig, Oakland, CA (US)

(73) Assignee: Victrio, Inc., Menlo Park, CA (US)

( * ) Notice: Subject to any disclaimer, the term of this patent is extended or adjusted under 35 U.S.C. 154(b) by 28 days.

(21) Appl. No.: 12/856,037

(22) Filed: Aug. 13, 2010

(65) Prior Publication Data
US 2010/0305960 A1 Dec. 2, 2010

Related U.S. Application Data
(63) Continuation-in-part of application No. 11/404,342, filed on Apr. 14, 2006.
(60) Provisional application No. 60/673,472, filed on Apr. 21, 2005, provisional application No. 61/335,677, filed on Jan. 11, 2010.

(51) Int. Cl.
*G06F 40/00* (2006.01)
(52) U.S. Cl.
USPC .............................. 705/38; 705/71
(58) Field of Classification Search
USPC .......................................... 705/38
See application file for complete search history.

(56) References Cited

U.S. PATENT DOCUMENTS

| | | | |
|---|---|---|---|
| 4,653,097 A | 3/1987 | Watanabe et al. | |
| 5,805,674 A | 9/1998 | Anderson, Jr. | |
| 5,999,525 A | 12/1999 | Krishnaswamy et al. | |
| 6,044,382 A * | 3/2000 | Martino | 715/234 |
| 6,145,083 A | 11/2000 | Shaffer et al. | |
| 6,266,640 B1 | 7/2001 | Fromm | |
| 6,427,137 B2 | 7/2002 | Petrushin | |
| 7,039,951 B1 | 5/2006 | Chaudhari et al. | |
| 7,212,613 B2 | 5/2007 | Kim et al. | |
| 7,386,105 B2 | 6/2008 | Wasserblat et al. | |
| 7,539,290 B2 * | 5/2009 | Ortel | 379/88.02 |
| 7,657,431 B2 | 2/2010 | Hayakawa | |
| 7,668,769 B2 | 2/2010 | Baker et al. | |
| 7,822,605 B2 | 10/2010 | Zigel et al. | |
| 7,908,645 B2 | 3/2011 | Varghese et al. | |
| 8,112,278 B2 | 2/2012 | Burke | |

(Continued)

FOREIGN PATENT DOCUMENTS
EP 0598469 A2 5/1994

OTHER PUBLICATIONS
TaKahashi, Tsutomu; Voiceprint Recognition System; Jul. 22, 2004; © 2012 JPO & JAPIO; 19/3,K/1 (Item 1 from file: 347).*

(Continued)

*Primary Examiner* — Charles Kyle
*Assistant Examiner* — Michael Cranford
(74) *Attorney, Agent, or Firm* — Carr & Ferrell LLP

(57) ABSTRACT

Disclosed is a method for enrolling a voiceprint in a fraudster database, the method comprising: a) defining a fraud model comprising at least one hypothesis indicative of a fraudulent transaction; b) processing audio data based on the fraud model to identify at least one suspect voiceprint in the audio data suspected of belonging to a fraudster; and c) enrolling the at least one suspect voiceprint in the fraudster database.

23 Claims, 7 Drawing Sheets

(56) References Cited

U.S. PATENT DOCUMENTS

| | | |
|---|---|---|
| 2001/0026632 A1 | 10/2001 | Tamai |
| 2002/0099649 A1 | 7/2002 | Lee et al. |
| 2003/0208684 A1 | 11/2003 | Camacho et al. |
| 2004/0029087 A1 | 2/2004 | White |
| 2004/0131160 A1 | 7/2004 | Mardirossian |
| 2004/0240631 A1 | 12/2004 | Broman et al. |
| 2005/0043014 A1 | 2/2005 | Hodge |
| 2005/0125226 A1* | 6/2005 | Magee ............................ 704/246 |
| 2005/0125339 A1 | 6/2005 | Tidwell et al. |
| 2005/0185779 A1 | 8/2005 | Toms |
| 2006/0106605 A1 | 5/2006 | Saunders et al. |
| 2006/0161435 A1 | 7/2006 | Atef et al. |
| 2006/0212407 A1* | 9/2006 | Lyon ................................ 705/71 |
| 2006/0248019 A1 | 11/2006 | Rajakumar |
| 2006/0282660 A1 | 12/2006 | Varghese et al. |
| 2006/0293891 A1 | 12/2006 | Pathuel |
| 2007/0041517 A1 | 2/2007 | Clarke et al. |
| 2007/0074021 A1 | 3/2007 | Smithies et al. |
| 2007/0280436 A1 | 12/2007 | Rajakumar |
| 2007/0282605 A1 | 12/2007 | Rajakumar |
| 2008/0010066 A1 | 1/2008 | Broman et al. |
| 2009/0046841 A1 | 2/2009 | Hodge |
| 2009/0119106 A1 | 5/2009 | Rajakumar et al. |
| 2009/0147939 A1 | 6/2009 | Morganstein et al. |
| 2009/0254971 A1* | 10/2009 | Herz et al. ........................ 726/1 |
| 2010/0228656 A1 | 9/2010 | Wasserblat et al. |
| 2010/0303211 A1 | 12/2010 | Hartig et al. |
| 2010/0305946 A1 | 12/2010 | Gutierrez et al. |

OTHER PUBLICATIONS

CellMax Systems LTD; Method and System for Verifying and Enabling User Access Based on Voice Parameters; © 2012 WIPO/Thomson; 19/3K/7 (Item 5 from file:349).*

Glendale Technology Corporation; Speech and Voice Signal Processing; © 2012 WIPO/Thomson; 19/3K/9 (Item 7 from file:349).*

* cited by examiner

METHOD AND SYSTEM FOR ENROLLING A VOICEPRINT IN A FRAUDSTER DATABASE

RELATED APPLICATIONS

This application is a continuation-in-part of the U.S. patent application Ser. No. 11/404,342, titled "Method and System to Detect Fraud Using Voice Data" and filed Apr. 14, 2006, which in turn claims priority benefit to U.S. provisional patent application Ser. No. 60/673,472, titled "Detecting fraudulent use of financial account numbers using voiceprints" and filed Apr. 21, 2005. This application claims the benefit of priority to the U.S. 61/335,677, titled "Method for Correlating Fraud Audio to Textual Fraud Reports Using Word Spotting" and filed Jan. 11, 2010.

TECHNICAL FIELD OF THE DISCLOSURE

Embodiments of the disclosure relate to a method and system to detect fraud such as credit card fraud.

BACKGROUND OF THE DISCLOSURE

Modern enterprises such as merchants, banks, insurance companies, telecommunications companies, and payments companies are susceptible to many forms of fraud. One example of fraud that is particularly pernicious is credit card fraud. With credit card fraud, a fraudster fraudulently uses a credit card or credit card credentials (name, expiration, etc.) of another to enter into a transaction for goods or services with a merchant. The merchant provides the goods or services, but since the transaction is with the fraudster the merchant runs the risk of not getting paid.

Unfortunately, the process of detecting an instance of credit card fraud committed with a particular credit card may take months after the date of transaction. For example, the credit card holder must detect the fraudulent transaction and notify the credit card company that issued the credit card. The credit card company must then process the notification and report that the credit card in question is compromised by sending a fraud report to merchants. During that time a fraudster may perpetrate further instances of credit card fraud with said credit card.

Another example of fraud that is very difficult for merchants, particularly large merchants, to detect, if at all, occurs in the job application process where an applicant has been designated as undesirable in the past—perhaps as a result of having been fired from the employ of the merchant at one location or for failing a criminal background check—fraudulently assumes a different identity and then applies for a job with the same merchant at a different location. In such cases, failure to detect the fraud could result in the rehiring of the fraudster to the detriment of the merchant. If the fraudster has assumed a new identity, background checks based on identity factors such as names or social security numbers become essentially useless. For example consider that case of a large chain store, such as, for example, Walmart. In this case, an employee can be terminated for say theft at one location, but then rehired under a different identity at another location. The employee represents a grave security risk to the company particularly since the employee, being familiar with the company's systems and internal procedures will be able to engage in further conduct injurious to the company.

SUMMARY OF THE DISCLOSURE

In one aspect, the present disclosure provides a method for enrolling a voiceprint in a fraudster database, the method comprising: a) defining a fraud model comprising at least one hypothesis indicative of a fraudulent transaction; b) processing, audio data based on the fraud model to identify at least one suspect voiceprint in the audio data suspected of belonging to a fraudster; and c) enrolling the at least one suspect voiceprint in the fraudster database.

In another aspect, the present disclosure provides a system for enrolling a voiceprint in a fraudster database, the system comprising: a) a memory device capable of storing a fraud model comprising at least one hypothesis indicative of a fraudulent transaction; b) a voice processing engine capable of processing audio data based on the fraud model to identify at least one suspect voiceprint in the audio data suspected of belonging to a fraudster; and c) an enrollment engine capable of enrolling the at least one suspect voiceprint in the fraudster database.

In yet another aspect of the present disclosure, the present disclosure provides computer-implemented methods, computer systems and a computer readable medium containing a computer program product for enrolling a voiceprint in a fraudster database, the computer program product comprising: a) program code for defining a fraud model comprising at least one hypothesis indicative of a fraudulent transaction; b) program code for processing audio data based on the fraud model to identify at least one suspect voiceprint in the audio data suspected of belonging to a fraudster; and c) program code for enrolling the at least one suspect voiceprint in the fraudster database.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Figure 1:
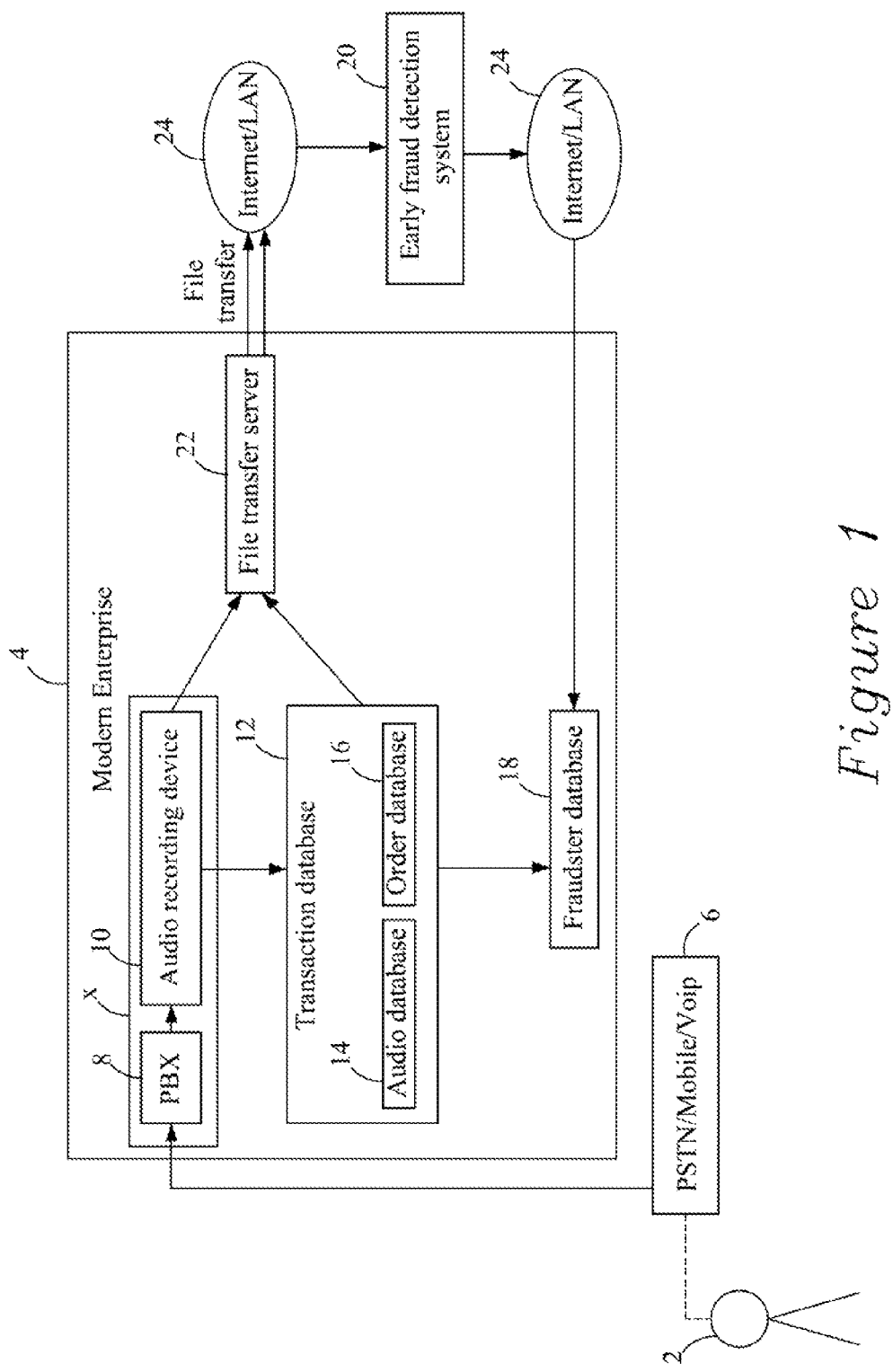
FIG. 1 shows a pictorial representation of a system used for early fraud detection and early enrollment of a fraud voiceprint into a fraudster database, in accordance with an embodiment of the present disclosure.

The method and system have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Broadly, embodiments of the present disclosure at least reduce losses due to fraudulent transactions, for example, credit card transactions by using voice data to identify fraudsters. Specifically, the method and system disclosed herein help modern enterprises such as merchants, banks, insurance companies, telecommunications companies, and payments companies by checking whether a caller is a fraudster by checking call audios. The detected audio is enrolled into a fraudster database which may then be used to stop future fraudulent transactions in the manner described in the specifications of U.S. Ser. No. 11/404,342, U.S. Ser. No. 11/754, 974, U.S. Ser. No. 11/754,975, and U.S. Ser. No. 12/352,530, each of which is incorporated herein by reference. In case of a credit card fraud, as described in the patent applications incorporated herein by reference, frauds are first detected by the credit card companies and are then enrolled into the fraudster database. However, in the present disclosure, frauds are detected at the merchant's end and are then enrolled into the fraudster database i.e. there is an early/advance enrollment of the frauds into the fraudster database. Specifically, a fraud is enrolled into the fraudster database at an early stage i.e. before receiving a fraud report from a credit card company. Therefore, the early/advance enrollment of frauds into the fraudster database may save merchants from getting duped by alerting them at an early stage. It is to be understood that although the present disclosure explains the method and the system in context of a credit card fraud, the method and system may be used in a similar manner for other types of frauds such as loan fraud, insurance fraud, all types of identity fraud, employment fraud, etc.

Referring to FIG. 1, a pictorial representation of a system used for early fraud detection and early enrollment of a fraud voiceprint into a fraudster database is shown, in accordance with an embodiment of the present disclosure. In one embodiment, a caller 2 may call a modern enterprise 4 using a suitable telephone network such as PSTN/Mobile/VOIP 6 for placing an order for goods or services. In one embodiment, a Private Branch Exchange (PBX) 8 may be used to receive the call. The PBX 8 may send the call audio to an audio recording device 10 which may record the call audio. In one embodiment, a call-center 'X' may receive and record the call on behalf of the modern enterprise 4, however, in another embodiment, the modern enterprise 4 may employ an agent (in house or outsourced) or any other third party to receive and record the call.

The audio recording device 10 may be configured to transmit the recorded call to a transaction database 12, hereinafter database 12. The database 12 includes phone details of all possible calls received at the modern enterprise 4. In one embodiment, the phone details may include at least one of an audio conversation between the modern enterprise 4 and the callers, an amount of the transaction, type of goods or services ordered for (in case of a credit card transaction), a time of call, quantity of goods, reason for the call like placing an order or checking status, credit card credentials, a recipient of the goods, a place of shipment, billing address, caller identity such as a name and/or a social security number of the caller or agent ID (in case of an agent) or an employee ID number, a phone number from which the call is made, a phone number to which the call is made, and other transaction information. In one embodiment, the database 12 may include an audio database 14 and an order database 16. The audio database 14 is capable of storing call audios and the order database 16 is capable of storing order details.

The modern enterprise 4 may also include a fraudster database 18. The fraudster database 18 includes voice signatures or voice prints of known fraudsters. Essentially, a voice signature or voice print includes a set of voice characteristics that uniquely identify a person's voice. In one embodiment, each voice signature in the fraudster database 18 is assigned a unique identifier (ID), which in accordance with one embodiment may include one or more incident details such as a social security number used, a name used, credit card credentials used, date and time of fraud, an amount of the fraud, a type of fraud, enterprise impacted, and other details associated with the fraud incident.

In one embodiment, the phone details of certain callers may be transmitted to an Early Fraud Detection (EFD) system 20 via a file transfer server 22 using Internet/LAN 24. The EFD system 20 helps in early enrollment of a suspect voiceprint into the fraudster database 18. Specifically, the EFD system 20 processes the phone details of the callers to identify suspect voice prints present in the database 12 to enroll certain suspect voiceprints into the fraudster database 18. The suspect voice prints are enrolled into the fraudster database 18 which may then be used to stop future fraudulent transactions in the manner described in the specifications of U.S. Ser. No. 11/404,342, U.S. Ser. No. 11/754,974, U.S. Ser. No. 11/754, 975, and U.S. Ser. No. 12/352,530, each of which is incorporated herein by reference. More details about the working of the EFD system 20 will be described later in this section. In one embodiment, the EFD system 20 may be a distributed system that includes components that are not all located at a single location, but instead are distributed over multiple locations. The EFD system 20 may include software to facilitate communications with the modern enterprise 4 or the call-center 'X' to access the database 12. In one embodiment, the software may include a browser which is an application that facilitates communications via the Internet with the modern enterprise 4 or the call center 'X' using networking protocols such as for example the Hypertext Transfer Protocol (HTTP)/ the Internet Protocol (IP), the Simple Object Access Protocol (SOAP), etc. In another embodiment, the EFD may be integrated in the modern enterprise 4, thereby alleviating the need of transferring the phone details of callers.

Figure 2:
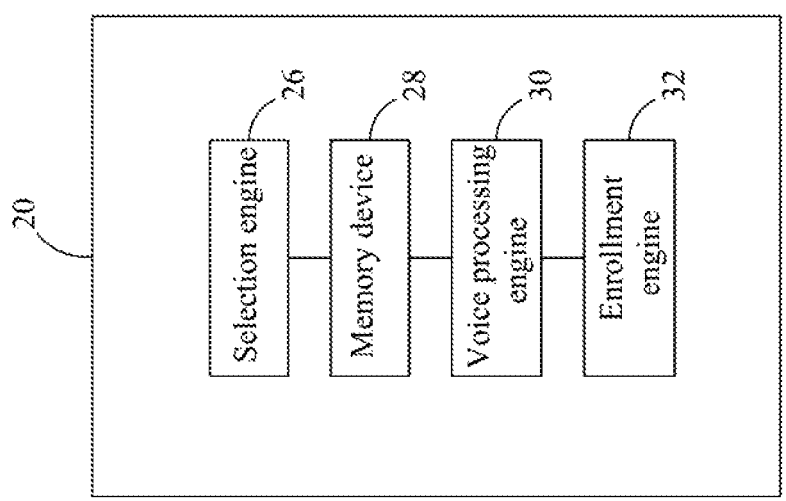
FIG. 2 shows a high level block diagram of an Early Fraud Detection system, in accordance with one embodiment of the present disclosure.

Referring now to FIG. 2, an internal block diagram of the EFD system 20 is shown, in accordance with an embodiment of the present disclosure. The EFD system 20 includes a selection engine 26, a memory device 28, a voice processing engine 30, and an enrollment engine 32. Each of the components 26 to 32 may be implemented in hardware or in software or as a combination of both hardware and software. Further, it is to be understood that while the components 26 to 32 are shown as separate components based on function, some or all the components may be integrated.

In one embodiment, the EFD system 20 may use the selection engine 26 to select or choose certain audio data from the database 12. The audio data may include phone details of some callers. Selecting audio data from the database 12 is important because the database 12 includes a high volume of data and will consume a lot of time if analyzed completely. Therefore, to save time and computations, a part of the database 12 is selected for analysis. This also helps in maintaining a good speed of the EFD system 20. In one embodiment, the selection engine 26 may stream audio data via the file transfer server 22 in real time or after the call or on demand using Internet/LAN 24. Alternatively, the selection engine 26 may request for audio data in a batch using transmitting techniques such as Email/Voice Over Internet Protocol (VOIP)/HTTP/Service Control Point (SCP)/Session Initiation Protocol (SIP) via the Internet/LAN 24.

In one embodiment, the audio data may be selected based on selection criteria. The selection criteria may help in filtering the database 12 to select the audio data in a way such that a maximum probability of identifying a fraudster is achieved. The selection criteria may be defined considering a pattern which may be followed by fraudsters. In other words, the selection criteria may help in segregating high risk audio data from the database 12. For example, in one embodiment, the audio data of last two weeks may be selected for analysis. This may be done because when a fraudster hacks certain credit cards, they generally have less time to do as many transactions as possible before the credit card stops working. Therefore, selecting the audio data of the last two weeks may be helpful to identify a fraudster. Further, the selection criteria may also include multiple calls made from a same phone number. This may be helpful to identify a fraudster because a fraudster may use a same phone line to place orders.

Other selection criteria may include multiple calls made from a specific phone number pattern. This may be helpful because the fraudster can use different public telephone booths in a same town to place orders. Specific phone number pattern may belong to a specific geographic location. The selection criteria may also include specific out-of-pattern orders such as an order for five LCD TVs within two days from a specific phone number pattern. The selection criteria may also include transaction profile similarities, for example all orders for a specific number and/or type of product, all wire transfers made before 9:00 A.M., similar transactions including transactions related to a specific geographic location and transactions related to a specific action such as change of address on an account, all calls for same account, random sampling, all orders that exceed a certain dollar value, all calls that have been call forwarded (all calls with similar telephony characteristics), all calls from a specific service provider (Skype or VOIP, landline, or mobile), calls for which an expected channel (landline, wireless, or VOIP) that phone number is associated with (based on phone data records) is different from a channel detected (e.g. by channel detection determined by analyzing audio signal characteristics), all calls from Automatic Number Identifications (ANIs) frequently used, etc. Therefore, based on these selection criteria, the audio data may be selected for the purpose of identifying a fraudster in the audio data.

The audio data may be processed using the voice processing engine 30. Specifically, the voice processing engine 30 processes the audio data to uniquely identify individuals who called multiple times. More specifically, the voice processing engine 30 uses voice biometrics to identify individuals in the audio data who called multiple times. With the help of voice biometrics, the voice processing engine 30 scans each voice sample in the audio data to identify individuals who called multiple times. Subsequently, the voice processing engine 30 determines whether the individuals who called multiple times used multiple caller identities. This may be done by checking the phone details which include caller identity information of all the callers. A person who called multiple times using multiple caller identities may be a fraudster. In one embodiment, when a fraudster uses a certain number of credit cards, he may also use the identity of the actual credit holder to place an order for goods or services over the phone. When the fraudster uses more than one credit card, he may use more than one caller identity. Therefore, a person who called multiple times using multiple caller identities may be a fraudster. In another embodiment, when an employee, who was fired by a merchant at one location, may use a different identity to get a job with the same merchant at a different location. Therefore, the employee who called multiple times using multiple caller identities may be a fraudster.

Based on these types of frauds, a fraud model may be defined. Specifically, the fraud model may be based on a fraudster who called multiple times using multiple identities. In one embodiment, the fraud model may be stored in the memory device 28. Further, the fraud model may include at least one hypothesis indicative of a fraudulent transaction. In the present embodiment, the hypothesis includes a single voiceprint being matched to multiple caller identities. The hypothesis may be manually coded into the memory device 28.

In the present embodiment, the voice processing engine 30 processes the audio data based on the fraud model to identify at least one suspect voiceprint in the audio data suspected of belonging to a fraudster. More specifically, the voice processing engine 30 checks the audio data to determine whether the individuals who called multiple times used multiple caller identities. In other words, the voice processing engine 30 checks the phone details of individuals who called multiple times to determine whether the hypothesis is true or not. If the hypothesis is true, i.e. if an individual is found to have called multiple times using multiple caller identities, the enrollment engine 32 enrolls the suspect voiceprint into the fraudster database 18. Otherwise, a next set of audios in the audio data is checked. In one embodiment, the EFD system 20 may periodically check the database 12 to proactively enroll a suspect voiceprint into the fraudster database 18 prior to receiving a fraud report from a credit card company or from the merchant. In another embodiment, the EFD system 20 may perform such a check on demand by a modern enterprise. Therefore, with each such check, the EFD system 20 may shrink the window between the fraud event and the modern enterprise realization that a fraud has occurred.

Figure 3:
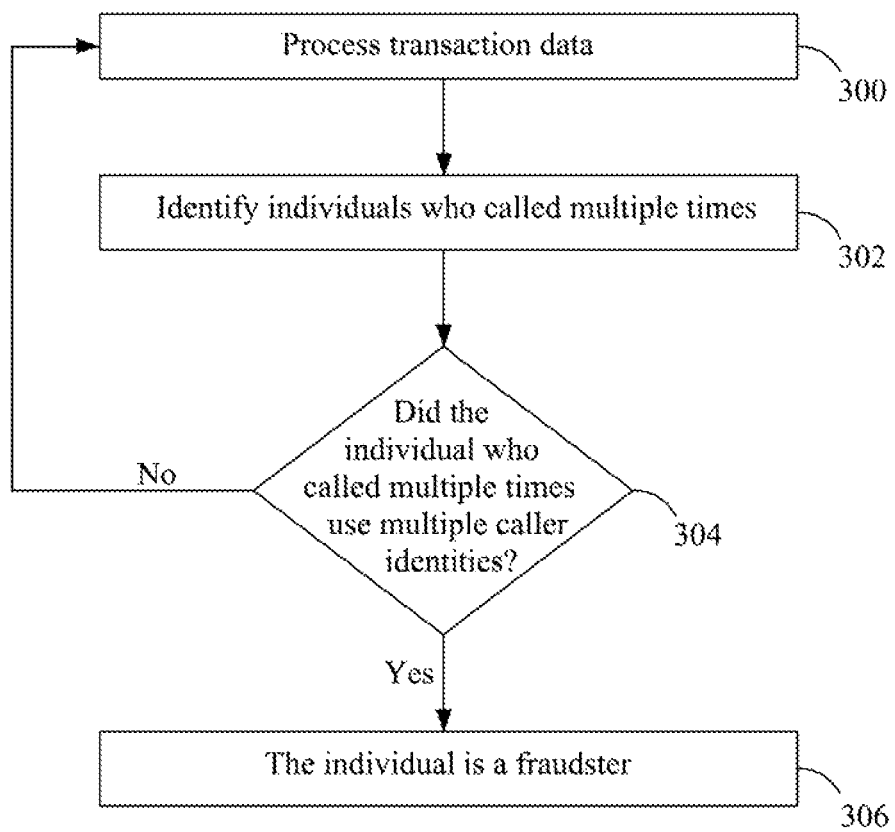
FIG. 3 shows a high level flowchart of a method to determine whether a suspect voiceprint belongs to a fraudster, in accordance with an embodiment of the present disclosure.

Referring to FIG. 3, a high level flowchart of a method to determine whether a suspect voiceprint belongs to a fraudster is shown, in accordance with an embodiment of the present disclosure. At 300, a set of audios of the audio data having suspect voiceprints is processed. At 302, individuals who called multiple times are identified. At 304, it is determined whether the individuals who called multiple times used multiple caller identities. If yes, then the individual is declared a fraudster at 306 and the suspect voiceprint is enrolled into the fraudster database 18. Otherwise, a next set of audios of the audio data is processed at 300.

Figure 4:
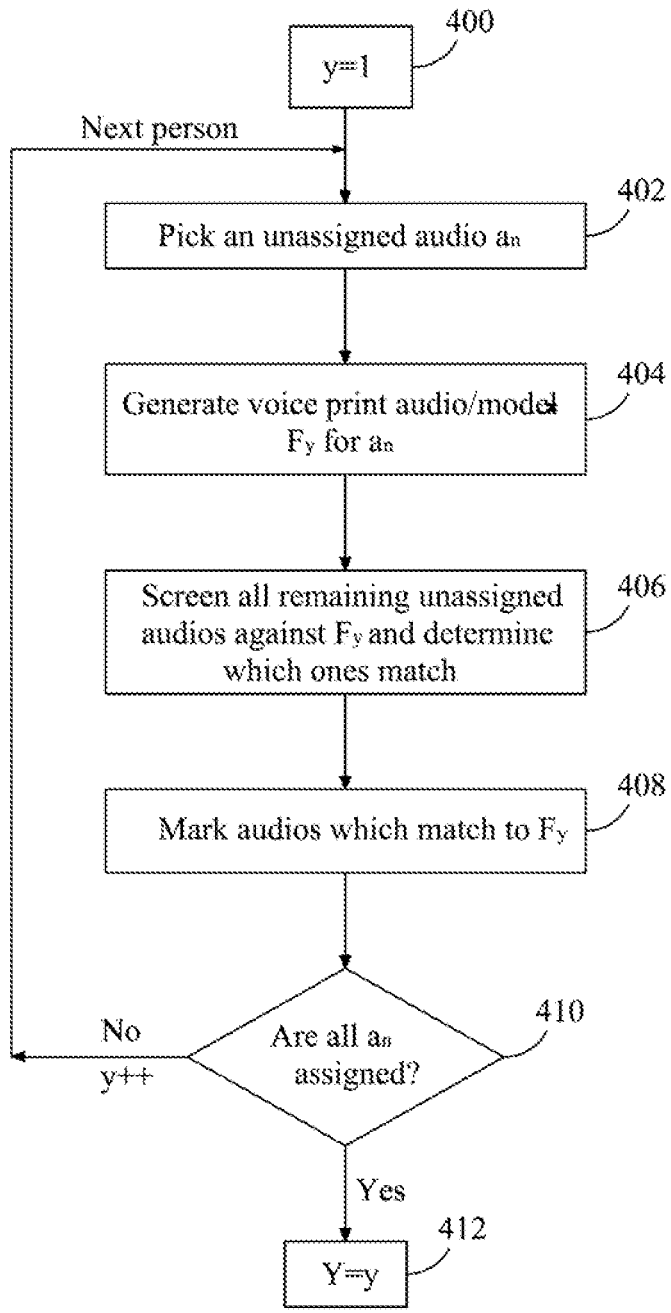
FIG. 4 shows a flowchart of a method to determine whether an individual from audio data called multiple times, in accordance with an embodiment of the present disclosure.

Referring to FIG. 4, a flowchart of a method to determine whether an individual from the audio data called multiple times is shown, in accordance with an embodiment of the present disclosure. In one embodiment, to determine this, let us assume that the number of audios in the audio data are 'N' i.e. from $a_1$ to $a_n$ and the number of callers who called multiple times are Y i.e. from $F_1$ to $F_y$, where $Y \leq N$. In the flowchart, at 400, a first person is chosen. At 402, an unassigned audio $a_n$ is picked up. At 404, a voice print model $F_y$ is generated for $a_n$. At 406, all the remaining audios of the set $a_1$ to $a_n$ are screened against the voice print $F_y$ and it is determined which audios from the $a_1$ to $a_n$ match voice print $F_y$. At 408, all the audios from the set of $a_1$ to $a_n$ that match the voiceprint $F_y$, are marked. At 410, it is determined whether all audios i.e. $a_n$ are assigned. If no, then a next person is chosen to run the flowchart on. If yes, then at 412 it is determined that Y=y. This means that the corresponding individuals called multiple times.

Figure 5:
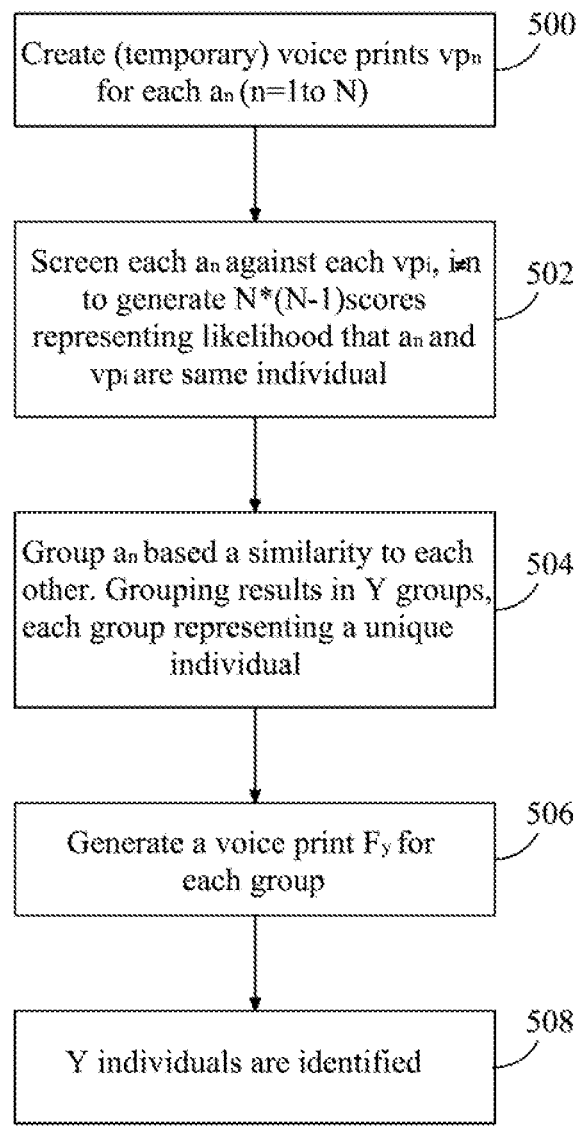
FIG. 5 shows a flowchart of a method to determine whether an individual from audio data called multiple times, in accordance with an embodiment of the present disclosure.

Referring to FIG. 5, a flowchart of a method to determine whether an individual from the audio data called multiple times is shown, in accordance with an embodiment of the present disclosure. In one embodiment, to determine this, let us assume that the number of audios in the audio data are 'N' i.e. from $a_1$ to $a_n$ and the number of callers who called multiple times are Y i.e. from $F_1$ to $F_y$, where $Y \leq N$. In the flowchart, at 500, temporary voice prints $Vp_n$ are created for each an (n=1 to N). At 502, each $a_n$ is screened against $Vp_i (i \neq n)$ to generate $N*(N-1)$ scores representing likelihood that $a_n$ and $Vp_i$ are same individual. At 504, similar audios are grouped resulting in Y groups, each group representing a unique individual. At 506, a voiceprint $F_y$ is generated for each group. At 508, Y individuals are identified.

Figure 6:
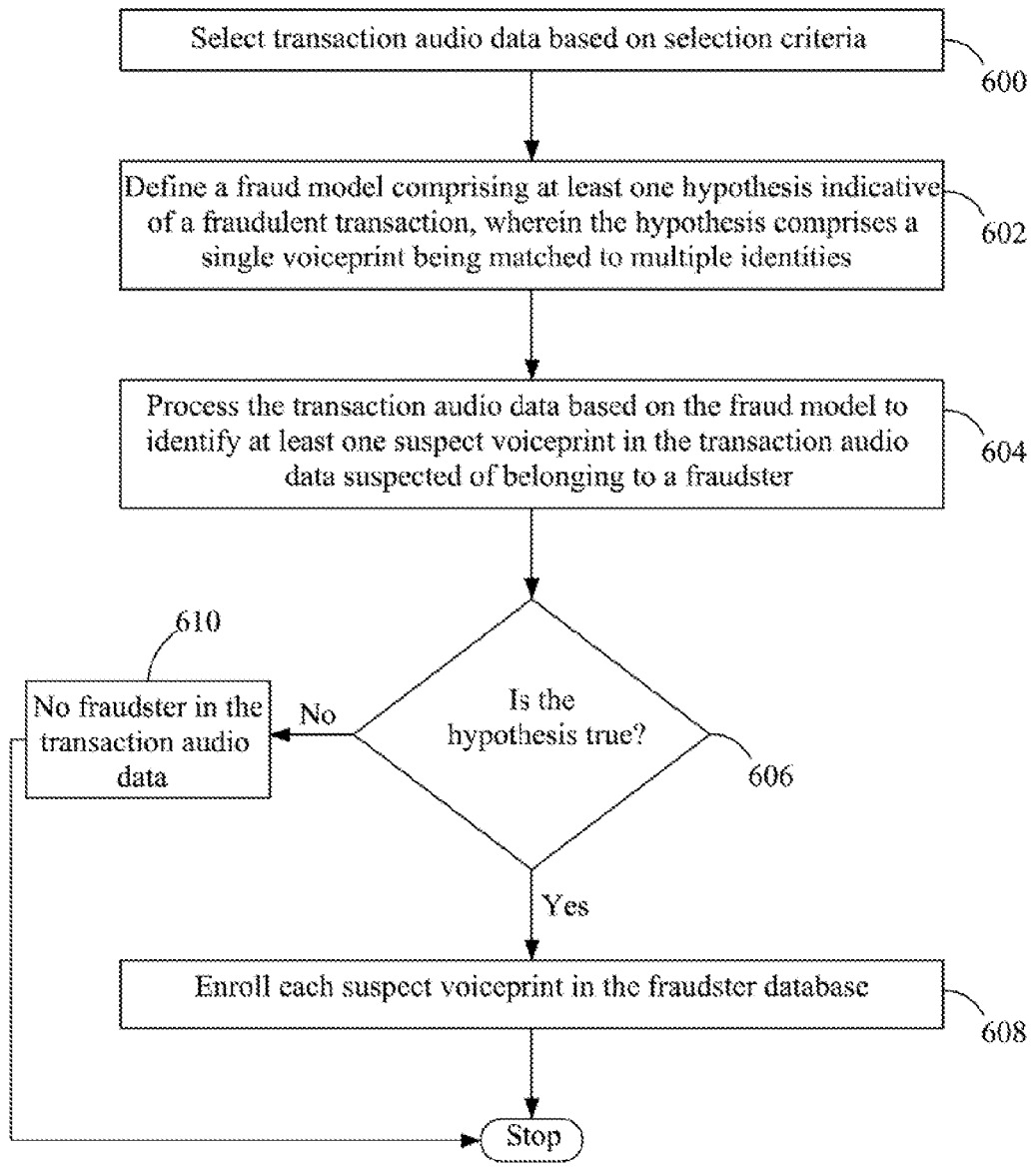
FIG. 6 shows a flowchart of a method for early fraud detection and enrolling a voiceprint into a fraudster database, in accordance with an embodiment of the present disclosure.

Referring now to FIG. 6, a flowchart of a method for early fraud detection and enrolling a voiceprint into a fraudster database 18 is shown, in accordance with an embodiment of the present disclosure. At 600, audio data may be selected based on selection criteria. Further, at 602, a fraud model is defined. The fraud model includes at least one hypothesis indicative of a fraudulent transaction. In one embodiment, the hypothesis indicative of the fraudulent transaction includes a single voiceprint being matched to multiple caller identities. At 604, the audio data is processed based on the fraud model to identify at least one suspect voiceprint in the audio data suspected of belonging to a fraudster. The suspect voiceprint is considered identified when the hypothesis is true. At 606, it is determined whether the hypothesis is true or not. If the hypothesis is true, then at 608, the suspect voiceprint is enrolled into a fraudster database 18. However, if the hypothesis is not true, then at 610, it is assumed that there is no fraudster in the audio data.

Figure 7:
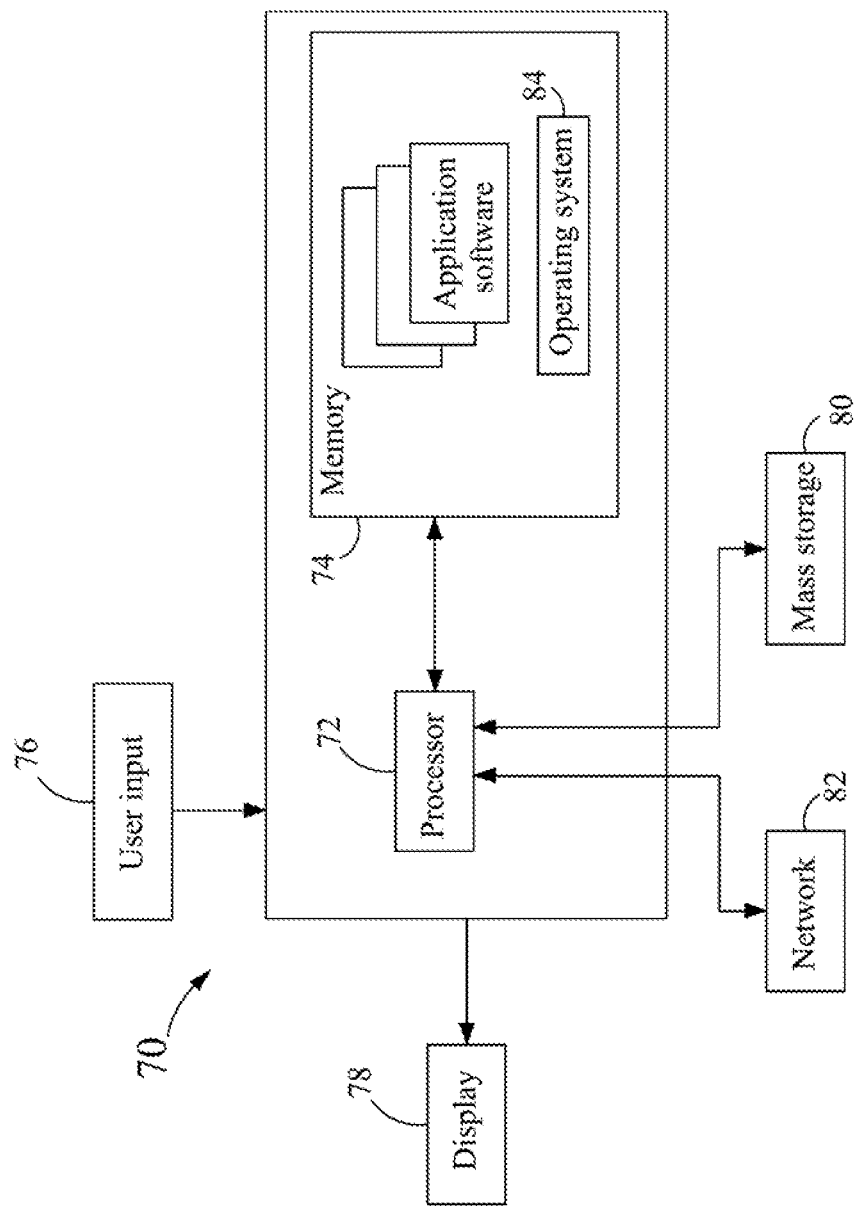
FIG. 7 shows hardware to implement the method disclosed herein, in accordance with an embodiment of the present disclosure.

Referring now FIG. 7, system 70 to implement the method disclosed herein is shown, in accordance with an embodiment of the present disclosure. The EFD system 20 and the server system have, thus far, been described in terms of their respective functions. By way of example, each of the EFD system 20 and server system of the present disclosure may be implemented using the system 70 of FIG. 7. The system 70 typically includes at least one processor 72 coupled to a memory 74. The processor 72 may represent one or more processors (e.g., microprocessors), and the memory 74 may represent random access memory (RAM) devices comprising a main storage of the system 70, as well as any supplemental levels of memory e.g., cache memories, non-volatile or back-up memories (e.g. programmable or flash memories), read-only memories, etc. In addition, the memory 74 may be considered to include memory storage physically located elsewhere in the system 70, e.g. any cache memory in the processor 72, as well as any storage capacity used as a virtual memory, e.g., as stored on a mass storage device 80.

The system 70 also typically receives a number of inputs and outputs for communicating information externally. For interface with a user or operator, the system 70 may include one or more user input devices 76 (e.g., a keyboard, a mouse, etc.) and a display 78 (e.g., a Liquid Crystal Display (LCD) panel).

For additional storage, the system 70 may also include one or more mass storage devices 80, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 70 may include an interface with one or more networks 82 (e.g., a local area network (LAN), a wide area network (WAN), a wireless network, and/or the Internet among others) to permit the communication of information with other computers coupled to the networks. It should be appreciated that the system 70 typically includes suitable analog and/or digital interfaces between the processor 72 and each of the components 74, 76, 78 and 82 as is well known in the art.

The system 70 operates under the control of an operating system 84, and executes various computer software applications, components, programs, objects, modules, etc. to perform the respective functions of the EFD system 20 and server system of the present disclosure. Moreover, various applications, components, programs, objects, etc. may also execute on one or more processors in another computer coupled to the system 70 via a network 82, e.g. in a distributed computing environment, whereby the processing required to implement the functions of a computer program may be allocated to multiple computers over a network.

In general, the routines executed to implement the embodiments of the present disclosure, may be implemented as part of an operating system or a specific applications component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the present disclosure. Moreover, while the disclosure has been described in the context of fully functioning computers and computer systems, those skilled in the art will appreciate that the various embodiments of the present disclosure are capable of being distributed as a program product in a variety of forms, and that the present disclosure applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

One advantage of the techniques and systems described herein is that fraud detection is based on a fraudster's voice, which being biometric in nature is linked to the fraudster. Further, the method and system enables a person to detect fraud much before a confirmed fraud report is issued by a credit card company thereby minimizing the amount of damage that could be caused.

We claim:

1. A method for enrolling a voiceprint in a fraudster database, the method comprising:
    defining storing a fraud model in a memory device, the fraud model comprising at least one hypothesis indicative of a fraudulent extraction of transactions related to a specific geographic location, wherein the fraud model is stored in a memory device;
    processing a batch of transactions audio data based on the fraud model to extract a plurality of transactions related to the specific geographical location, each of the extracted transactions including audio data and a caller identity, the processing performed using an early fraud detection engine;
    processing the audio data and caller identities of the extracted transactions to identify a group of similar audio data representing a unique individual, to determine that the unique individual has called multiple times and used multiple caller identities, and to generate a voiceprint from the audio data of a plurality if similar voices, the processing performed using a voice processing engine; and
    enrolling the at least one suspect generated voiceprint in a fraudster database using an enrollment engine.

2. The method of claim, 1 wherein the enrolling is performed prior to receiving a fraud report from a modern enterprise.

3. The method of claim 1, wherein the hypothesis comprises a single voiceprint being matched to multiple caller identities fraud model further comprises a phone number pattern belonging to the specific geographical location.

4. The method of claim 1, wherein the fraud model further comprises transactions related to a specific action requested by a caller.

5. The method of claim 4, wherein the specific action is change of address on an account at least one suspect voiceprint is enrolled in the fraudster database when the hypothesis is true.

6. The method of claim 1, further comprising generating a score representing a likelihood that two callers are the same individual, selecting the batch of audio data from a database based on selection criteria prior to the processing.

7. The method of claim 1, wherein selection criteria the fraud model further comprises at least one of a predetermined time period, random sampling, calls made to a same phone number, calls made-received from a same phone number, calls made to a specific phone number pattern, all calls for a same account, calls made received from a specific phone number pattern, call forwarded calls, calls from a specific service provider, similar transaction, and specific out-of-pattern transactions.

8. The method of claim 1, wherein similar transactions include transactions related to a specific the geographic location comprises at least one of a billing address, a place of shipment, a zip code, and transactions related to a specific action including change of an address on an account.

9. The method of claim 1, wherein each audio in the batch of audio data is associated with certain information comprising identity information of a caller, and wherein the caller identity information comprises at least one of a caller's name, a credit card number, a social security number, and a billing address.

10. A system for enrolling a voiceprint in a fraudster database, the system comprising:
    a memory device capable of storing a fraud model comprising a plurality of transactions originating from one or more phone numbers that match a phone number pattern at least one hypothesis indicative of a fraudulent transaction;
    an early fraud detection engine configured to process a batch of transactions based on the fraud model to extract the plurality of transactions originating from the specific phone number pattern, each of the extracted transactions including audio data and caller identities;
    a voice processing engine capable of processing the audio data and caller identities of the extracted transactions to group similar voices, a batch of audio data based on the fraud model to identify at least one suspect to generate a single voiceprint for each group of similar voices, and to identify a generated voice print that matches audio data for multiple caller identities in the batch of audio data suspected of belonging to a fraudster; and an enrollment engine capable of enrolling the at least one suspect matched voiceprint in the fraudster database.

11. The system of claim 10, wherein the audio data comprises a voice sample recorded during the transaction enrollment engine enrolls the at least one suspect voiceprint in the fraudster database prior to receiving a confirmed fraud report from a modern enterprise.

12. The system of claim 10, wherein the hypothesis fraud model further comprises identifying calls originating from a phone number pattern using automatic number identification.

13. The system of claim 10, wherein the voice processing engine is further capable of creating a temporary voice print for the audio data of each of the extracted transactions.

14. The system of claim 13, wherein the voice processing engine is further capable of screening the temporary voice prints to generate scores representing a likelihood that two callers are the same individual.

15. The system of claim 10, further comprising a selection engine capable of selecting the batch of data transactions based on a predetermined time period prior to the processing of the batch of transactions audio.

16. The system of claim 10 wherein the fraud model further comprises at least one of a predetermined time period, random sampling, calls made to a same phone number, calls originating from a same phone number, calls made to a specific phone number pattern, all calls for a same account, similar transactions, call forwarded calls, calls from a specific service provider, and specific out-of-pattern transactions.

17. A computer readable non-transitory medium containing a computer program product for enrolling a voiceprint in a fraudster database, the computer program product comprising:
    program code for defining a fraud model selection criteria comprising transactions occurring during a predetermined time period at least one hypothesis indicative of a fraudulent transaction;
    program code for processing a batch of audio data transactions based on the fraud model selection criteria to select the plurality of transactions occurring during the predetermined time period, each of the transactions in the batch of transactions including audio data and caller identity information;
    program code for analyzing the audio data and caller identity information of the selected transactions to identify a suspected fraudster who has called multiple times during the predetermined period and used multiple caller identities identify at least one suspect voiceprint in the batch audio data suspected of belonging to a fraudster; and
    program code for enrolling a voiceprint of the suspected fraudster in the fraudster database.

18. The computer program product of claim 17, wherein the predetermined time period is less than about two weeks enrolling is performed prior to receiving a confirmed fraud report from a modern enterprise.

19. The computer program product of claim 17, wherein the program code for analyzing the audio data creates a voice print for the audio data of each of the extracted transactions hypothesis comprises a single voiceprint being matched to multiple caller identities.

20. The computer program product of claim 17, wherein the program code for processing the batch of transactions further comprises program code for determining whether the true transactions originate from a specific geographic location.

21. The computer program product of claim 20, wherein the program code for processing the batch of transactions further comprises program code for determining whether the transactions originate from a phone number pattern.

22. The computer program product of claim 17, further comprising program code for streaming the audio data from the selected transactions in real time for analyzing the audio data.

23. The computer program product of claim 17, wherein the selection criteria further comprises at least one of random sampling, calls made to a same phone number, calls ma4e-originating from a same phone number, calls made to a specific phone number pattern, all calls for a same account, calls originating from a specific phone number pattern, similar transactions, call forwarded calls, calls from a specific service provider, and specific out-of-pattern transactions.

* * * * *

UNITED STATES PATENT AND TRADEMARK OFFICE
CERTIFICATE OF CORRECTION

PATENT NO. : 8,510,215 B2
APPLICATION NO. : 12/856037
DATED : August 13, 2013
INVENTOR(S) : Richard Gutierrez et al.

It is certified that error appears in the above-identified patent and that said Letters Patent is hereby corrected as shown below:

In the Claims

Column 9, line 2, cancel the text beginning with "1. A method" to and ending "enrollment engine." in column 9, line 25, and insert the following claim:
--1. A method for enrolling a voiceprint in a fraudster database, the method comprising:
    storing a fraud model in a memory device, the fraud model comprising extraction of transactions related to a specific geographic location;
    processing a batch of transactions based on the fraud model to extract a plurality of transactions related to the specific geographical location, each of the extracted transactions including audio data and a caller identity, the processing performed using an early fraud detection engine;
    processing the audio data and caller identities of the extracted transactions to identify a group of similar audio data representing a unique individual, to determine that the unique individual has called multiple times and used multiple caller identities, and to generate a voiceprint from the audio data of a plurality of similar voices, the processing performed using a voice processing engine; and
    enrolling the generated voiceprint in a fraudster database using an enrollment engine.--

Column 9, line 29, cancel the text beginning with "3. The method" to and ending "geographical location." in column 9, line 32, and insert the following claim:
--3. The method of claim 1, wherein the fraud model further comprises a phone number pattern belonging to the specific geographical location.--

Column 9, line 36, cancel the text beginning with "5. The method" to and ending "is true." in column 9, line 39, and insert the following claim:
--5. The method of claim 4, wherein the specific action is change of address on an account.--

Column 9, line 40, cancel the text beginning with "6. The method" to and ending "the processing." in column 9, line 43, and insert the following claim:
--6. The method of claim 1, further comprising generating a score representing a likelihood that two callers are the same individual.--

Signed and Sealed this
Twenty-sixth Day of November, 2013

Margaret A. Focarino
*Commissioner for Patents of the United States Patent and Trademark Office*

CERTIFICATE OF CORRECTION (continued)
U.S. Pat. No. 8,510,215 B2

Column 9, line 44, cancel the text beginning with "7. The method" to and ending "out-of-patterns transactions." in column 9, line 52, and insert the following claim:

--7. The method of claim 1, wherein the fraud model further comprises at least one of a predetermined time period, random sampling, calls made to a same phone number, calls received from a same phone number, calls made to a specific phone number pattern, all calls for a same account, calls received from a specific phone number pattern, call forwarded calls, calls from a specific service provider, similar transaction, and specific out-of-pattern transactions.--

Column 9, line 53, cancel the text beginning with "8. The method" to and ending "an account." in column 9, line 57, and insert the following claim:

--8. The method of claim 1, wherein the geographic location comprises at least one of a billing address, a place of shipment, a zip code, and an address on an account.--

Column 9, line 58, cancel the text beginning with "9. The method" to and ending "billing address." in column 9, line 63, and insert the following claim:

--9. The method of claim 1, wherein the caller identity comprises at least one of a caller's name, a credit card number, a social security number, and a billing address.--

Column 9, line 64, cancel the text beginning with "10. A system" to and ending "fraudster database." in column 10, line 18, and insert the following claim:

--10. A system for enrolling a voiceprint in a fraudster database, the system comprising:
    a memory device capable of storing a fraud model comprising a plurality of transactions originating from one or more phone numbers that match a phone number pattern;
    an early fraud detection engine configured to process a batch of transactions based on the fraud model to extract the plurality of transactions originating from the specific phone number pattern, each of the extracted transactions including audio data and caller identities;
    a voice processing engine capable of processing the audio data and caller identities of the extracted transactions to group similar voices, to generate a single voiceprint for each group of similar voices, and to identify a generated voice print that matches audio data for multiple caller identities; and
    an enrollment engine capable of enrolling the matched voiceprint in the fraudster database.--

Column 10, line 19, cancel the text beginning with "11. The system" to and ending "modern enterprise." in column 10, line 23, and insert the following claim:

--11. The system of claim 10, wherein the audio data comprises a voice sample recorded during the transaction.--

Column 10, line 24, delete "hypothesis".

Column 10, line 35, delete "data".

Column 10, line 37, delete "audio".

CERTIFICATE OF CORRECTION (continued)
U.S. Pat. No. 8,510,215 B2

Column 10, line 45, cancel the text beginning with "17. A computer readable" to and ending "fraudster database." in column 10, line 67, and insert the following claim:

--17. A computer readable non-transitory medium containing a computer program product for enrolling a voiceprint in a fraudster database, the computer program product comprising:

program code for defining a selection criteria comprising transactions occurring during a predetermined time period;

program code for processing a batch of transactions based on the selection criteria to select the plurality of transactions occurring during the predetermined time period, each of the transactions in the batch of transactions including audio data and caller identity information;

program code for analyzing the audio data and caller identity information of the selected transactions to identify a suspected fraudster who has called multiple times during the predetermined period and used multiple caller identities; and program code for enrolling a voiceprint of the suspected fraudster in the fraudster database.--

Column 11, line 1, cancel the text beginning with "18. The computer program" to and ending "modern enterprise." in column 11, line 4, and insert the following claim:

--18. The computer program product of claim 17, wherein the predetermined time period is less than about two weeks.--

Column 11, line 5, cancel the text beginning with "19. The computer program" to and ending "caller identities." in column 11, line 9, and insert the following claim:

--19. The computer program product of claim 17, wherein the program code for analyzing the audio data creates a voice print for the audio data of each of the extracted transactions.--

Column 11, line 13, delete "true".

Column 11, line 25, delete "ma4e-".